Patented Dec. 16, 1947

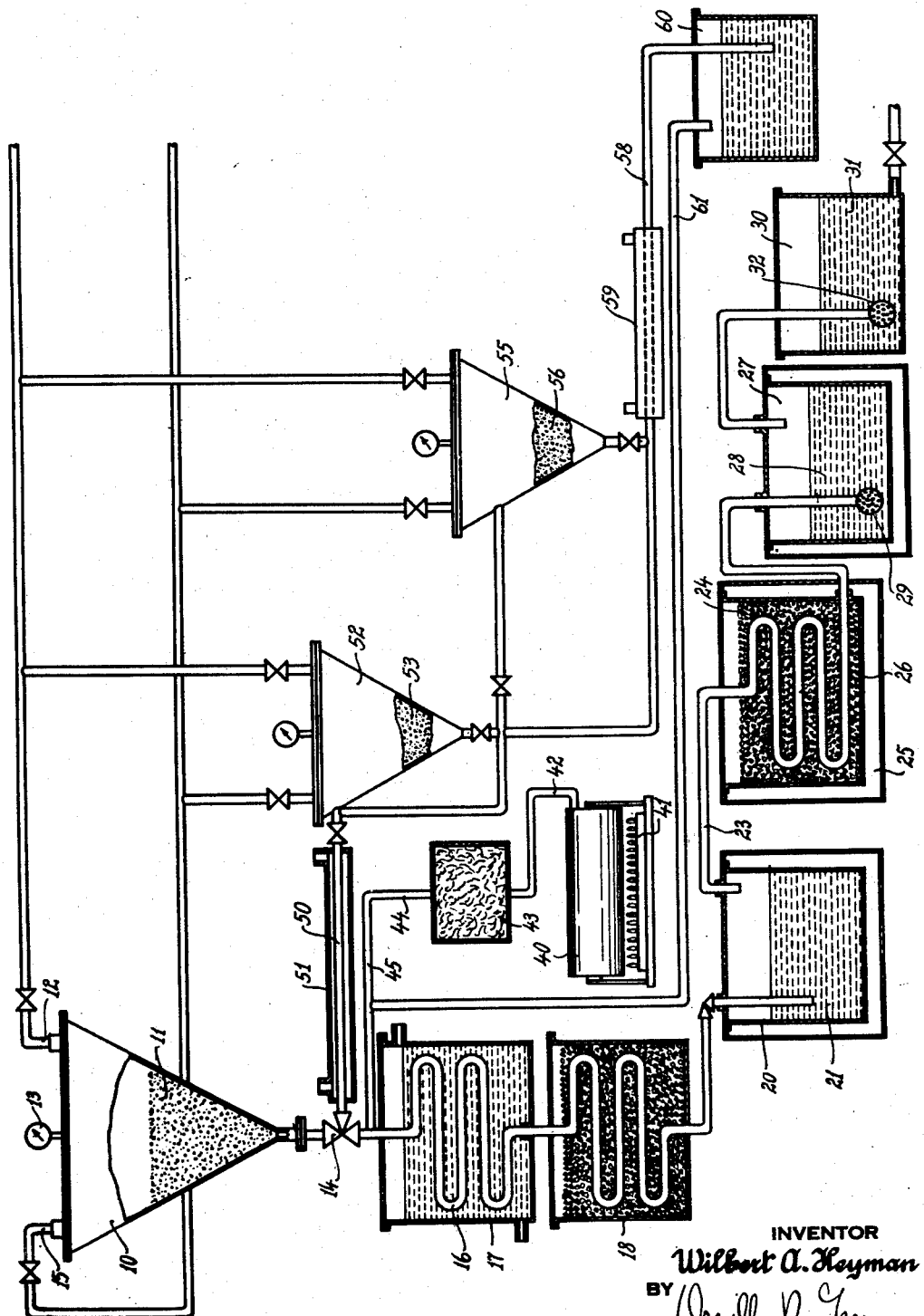

2,432,759

UNITED STATES PATENT OFFICE 2,432,759

PROCESS OF MAKING COFFEE CONCENTRATES

Wilbert A. Heyman, New York, N. Y., assignor to Baker Importing Company, New York, N. Y., a corporation of Minnesota Application January 11, 1941, Serial No. 374,044

10 Claims. (Cl. 99—71)

My invention relates to a novel coffee and more particularly my invention relates to a new combination of coffee constituents in which all the desirable elements of coffee are incorporated and undesirable elements of coffee are eliminated.

The desirability of coffee concentrates from which the normal coffee beverage can be made by the simple addition of hot water has long been recognized. Such coffee concentrates either in the form of liquid or powder have been hitherto suggested, but such concentrates are uniformly deficient in that during the manufacture of such concentrates a substantial portion of the highly volatile flavor elements both from the standpoint of aroma and taste have been lost.

I have conceived of a novel liquid coffee concentrate which I form according to a novel process and my liquid concentrate comprises the carefully separated desirable taste and aroma elements that are contained in good coffee.

By eliminating the rancidity inducing germ and embryo elements of the coffee according to the process of my Patent No. 2,154,447, I avoid the development in the coffee of the obnoxious taste and aroma elements which develop upon staling in ordinary coffee.

Roasted coffee contains a multiplicity of volatile aroma and flavor components which are subject to conversion or oxidation. These volatile aroma and flavor components include furfuryl alcohol, acetaldehyde, pyridine, furan, methylacetyl-carbinol, and hydrogen sulphide. Additionally methyl mercaptan, furfuryl mercaptan, dimethyl sulphide, acetyl-propionyl, vinyl guaiacol, acetic acid, and pyrazine have also been isolated from roasted coffee. It will be apparent that these volatile and relatively unstable components are susceptible to change and hence it is important that they be captured and preserved in any coffee concentrate.

It is the object of my invention to separate out from coffee those desirable elements which account for the flavor and aromatic characteristics of good coffee. Having extracted these essential constituents consisting both of the volatile constituents and the soluble solids of the coffee, I recombine these constituents together in substantially the proportions in which they are present in the original coffee. My process of extraction is of such a nature that I obtain excellent quantitative yields without the carrying over of any of the undesirable elements.

I further provide a novel concentrate by dissolving the volatile constituents only of the coffee in a suitable carrier medium such as a sugar solution. By so doing, I obtain a base for a non-foaming coffee beverage which is substantially immune against organic deterioration, for making hot coffee or a carbonated coffee beverage.

I also provide a process for decaffeinating coffee and I obtain a decaffeinated coffee concentrate.

It is the object of my invention to provide a novel liquid coffee concentrate.

It is a further object of my invention to separate coffee into its desirable and undesirable component elements and to eliminate the undesirable elements of the coffee and combine only the desirable elements thereof to provide a liquid coffee concentrate of superior taste and aroma.

It is a further object of my invention to provide a novel process by means of which all desirable taste and aroma elements of the coffee are extracted from the roasted and ground cracked purified beans and then recombined to provide a liquid concentrate or soluble solid coffee.

It is a further object of my invention to extract from coffee by steam distillation or by superheated water the volatile but condensable constituents of coffee and the volatile but relatively non-condensable constituents of coffee and to combine these in their original proportions with a concentrated liquid which is extracted from the residue after the steam distillation thereof.

It is a further object of my invention to provide a specific process by means of which I extract and condense the volatile condensable desirable constituents of coffee and I also extract and combine with an edible solvent, the volatile but relatively non-condensable flavor elements of roasted coffee.

Further objects of my invention will be apparent from a consideration of the drawings and a specific description thereof which here follows:

The figure is a schematic representation of the flow diagram of the process of my invention.

Referring now more specifically to the drawings, in Figure 1 I show an hermetically sealed chamber 10 in which is disposed ground and roasted coffee 11 which has been purified by removal after cracking, of the germ and embryo according to the process set forth in my Patent No. 2,154,447. The roasted coffee 11 with the impurities removed as described is then further reduced in size as by grinding.

Leading into chamber 10 is a source of steam 12 and as a source of steam any suitable supply may be employed. A gauge 13 measures the pressure of the steam in the chamber 10. Also leading into the chamber 10 is a pipe 15 which leads to a supply of hot water. Leading from the bottom of the chamber 10 is a coil 16 which passes first through cold water chamber 17 and then through an ice packed chamber 18 (above the freezing point of water).

The coil 16 then leads into refrigerated tank 20 and the volatile condensable constituents 21 remain in the tank 20 in the form of the liquid. Leading from the tank 20 is a pipe 23 through which passes the volatile relatively non-condensable elements. Pipe 23 is connected with a coil 24 which is positioned in an insulated chamber 25 which is packed with dry ice or some suitable cold inducing means so as to reduce the temperature of the volatile relatively non-condensable gases passing therethrough. The gases, of course, are more soluble and more readily absorbed in solvent in the cold. Pipe 23 then leads into the tank 27 which contains a liquid 28, the liquid 28 being a solvent for the volatile relatively non-condensable constituents of the coffee. In order to distribute the volatile relatively non-condensable constituents in the solvent, I employ spreading nozzles 29.

To provide for the complete absorption of the volatile relatively non-condensable elements a second tank 30 is provided containing the same or an analogous solvent 31 for the volatile relatively non-condensable constituents of the coffee. A nozzle 32 disperses the volatile relatively non-condensable elements in solvent 31.

By the term "volatile condensable constituents of coffee," as used in this specification, I mean those constituents of coffee which are volatilized and extracted from the coffee by the application of elevated temperatures, such as by steam which volatile products, upon being thoroughly chilled and cooled as by passing through receivers cooled with solid carbon dioxide, condense to a fluid form.

By the term "volatile relatively non-condensable constituents of coffee," as used in the specification, I mean those volatile constituents which when reduced in temperature, as by passing through receivers cooled with solid carbon dioxide, will not condense, and it is these gases which I term relatively non-condensable gases, since all gases can be condensed if the temperature is brought to a sufficiently low point. However, since such volatile products are not condensable at the temperature to which they are subjected by cooling with solid carbon dioxide, I chill such gases and absorb or dissolve them in a suitable solvent or liquid carrier medium.

I have found that by the use of ordinary ice in lieu of solid carbon dioxide that I can condense a good quantitative amount of the condensable constituents of the coffee and that it is not absolutely necessary that solid so-called "dry-ice" be employed for the condensation of the volatile condensable constituents.

A further important feature of my invention is the capture and use of the volatiles given off during the final stage in the roasting of coffee. These volatiles are similar to the volatiles discussed above and constitute a considerable and important portion of the flavor and aroma of the coffee. From a roaster 40 heated by suitable heating means 41, I draw off through a pipe 42 by means of a vacuum not here shown, the volatiles given off during the final stage of the roasting of coffee. The volatiles given off initially during the roasting of coffee are undesirable and I do not utilize these volatiles.

The vapors which I employ are those vapors which are given off from about three minutes before the completion of the roasting of the coffee to the completion of the roasting when the coffee is being roasted to what is known in the trade as the American type mild roast. When the roasting, known to the trade as the French or Italian roast is employed, then I utilize those vapors which are begun to be given off about six minutes before the completion of the roasting and utilize the vapors given off from that point to the time when the roasting is complete.

These vapors or volatiles are drawn through the pipe 42 and then pass through the filter 43 which comprises some suitable filtering means to remove dust or other undesirable solids, whereupon they pass through pipe 44 and pipe 45 into the coil 16 where the volatile condensables and the volatile non-condensables are separated out for utilization with the other similar components as will be explained more specifically hereinafter.

Alternatively to the hereinabove process set forth of introducing steam into the percolator chamber 10 from the pipe 12 and removing the distillate through the coil 16, I may introduce the steam at the bottom of the percolator chamber 10 and withdraw the volatile constituents and steam from the top of this chamber. By thus reversing the path of the steam, I completely avoid the carrying over of any of the soluble coffee solids during this stage. When steam is introduced at the top and the distillate removed at the bottom, I find that there sometimes is a certain solution effected of the soluble coffee solids and that such dissolved soluble coffee solids are therefore carried down with the distillate.

I have shown in the diagram a method by means of which concentration of the liquid that is used to dissolve the soluble solids of the coffee is effected. The liquid passing into the chamber 10 from the hot water supply 15 passes through the ground and roasted coffee which has been steam distilled as previously explained and then down through the valve 14 into the pipe 50 which is heated by the surrounding heating chamber 51 to maintain the fluid at an elevated temperature. The hot water having dissolved out the soluble solids of the coffee 11, then passes into the chamber 52 which is similar to chamber 10 and which contains ground and purified coffee 53, which has been steam distilled as has been the coffee 11. The hot water containing soluble solids of the coffee then passes through the ground and purified coffee 53 and is further concentrated thereby and then it again passes through suitable piping into another similar coffee chamber 55 containing ground and purified coffee 56 which has been steam distilled in the manner explained above. The hot water dissolving as it does each time soluble solids from the coffee 11, 53 and 56 becomes more and more concentrated and this process is preferably repeated until the concentration of the coffee solution reaches approximately 22 degrees Baumé. If necessary, to reach this concentration evaporation by heat may be resorted to. The hot water containing the soluble coffee solids then passes chamber 55 through the pipe 58 surrounded by the cooling jacket 59 and thence into tank 60 where it may be further concentrated if necessary.

In order to utilize all the coffee volatiles, I provide a lead off pipe 61 from the tank 60 which carries the volatiles that arise out of the solution of soluble coffee solids and this pipe 61 leads back into the coil 16 which I provide for condensing and separating the volatile condensables and volatile relatively non-condensable gases.

The operation of the apparatus of my invention is as follows:

About 150 pounds of ground and purified coffee 11 is subjected in the percolator chamber 10 to steam at about five to ten pounds pressure from the steam inlet 12. The steam passes over and through coffee 11 and volatilizes the volatile constituents thereof. Many of the desirable taste and aroma elements of coffee are volatile and such elements are picked up and volatilized by the steam which then passes out of the chamber 10 into the pipe 16. The mixture of steam and volatile constituents of the coffee is then condensed by passing through coils located in the cold water chamber 17 and the ice chamber 18. The reduction in temperature induced by the cold water and ice effects the condensation of the condensable volatile constituents of the coffee. Such condensable volatile constituents pass into the refrigerated tank 20 in the form of a liquid 21. The steam is continued until about 7 to 10 gallons are obtained. The relatively non-condensable volatile constituents of the coffee, however, pass out of the tank 20 through the pipe 23 and these volatile relatively non-condensable constituents are chilled in the dry ice chamber 25 in order to make them more soluble in the edible solvents 28 and 31 therefor. The volatile relatively non-condensable elements thereupon pass into the solvent traps 27 and 30 in which are located the edible solvents 28 and 31. These solvents should be edible and may, for example, be glycerin, ethyl alcohol, lactose, sucrose, or levulose or the like. By the use of a multiplicity of traps the non-condensable volatile constituents are thoroughly absorbed and dissolved into the edible solvents.

As described, therefore, the volatile condensable constituents and the volatile non-condensable constituents which are important elements of taste and aroma are separated and ready for use.

Through the coffee 11 from which the volatile constituents have now been removed, is passed hot water from the hot water inlet 15. It is within the purview of my invention to obtain a leached coffee concentrate by a number of different means. I shall illustrate two of the methods which I may employ. The non-volatile coffee constituents which remain are leached with hot water for a period of 24 hours to dissolve out the soluble coffee solids remaining in the coffee grounds, and the liquid solution thus obtained is concentrated by heating in a high vacuum to a concentration corresponding to 36° Bé. Each gallon of concentrate will contain about 7.3 lbs. of the edible soluble coffee solids. Coffee contains about 20 to 25% soluble solids.

Alternatively, as explained above, the hot water may be passed continuously through a series of coffee residues 11 until the solution reaches the desired concentration corresponding to about 22° Bé. Each gallon of this concentrate contains about 3.8 lbs. of soluble coffee solids. This solution may be further concentrated as by heating to obtain a greater proportional content of soluble coffee solids.

I then combine this concentrated coffee solution with the volatile condensable constituents 21 and the volatile relatively non-condensable constituents dissolved in the edible solvents 1 and 30 in the following proportions:

| | Ounce |
|---|---|
| Concentrated coffee solids, extracted as by leaching, as above, 36° Baumé | 59 |
| Solvent, such as glycerin containing volatile non-condensable flavoring | 25 |
| Volatile condensable constituents | 44 |

These proportions correspond generally to the proportions as contained in the original roasted coffee bean.

The solution mixture obtained as described has a concentration of about 25° Baumé. One teaspoon of this makes one cup of coffee of fine flavor and aroma. The glycerine, representing 20%, in addition to acting as a solvent for the volatile relatively non-condensable constituents also acts as a preservative preventing yeast and mold growth and thus retaining the desirable flavor of the coffee for a long period of time.

To make a soluble dry coffee, as for example in the form of powder, the concentrated water solution of the coffee residue mixed with the volatile relatively non-condensable constituents is dried under a high vacuum at a relatively low temperature, e. g., 110° F., and in lieu of the difficultly dryable glycerine, a more readily drying edible solvent for the volatile non-condensable constituents of the coffee is employed, such as for example alcohol or sugar. Solid concentrated coffee residue acts as a carrier for the volatile condensables and the volatile relatively non-condensables and acts to prevent any substantial volatilization thereof.

The dry soluble coffee is then used in proportion of .07 of an ounce to a cup of boiling water to make a cup of coffee, which has a superior flavor and aroma.

In order to secure the maximum amounts of volatile condensables, I may separate volatile condensables from the water contained in the mixture 21 by use of a solvent for the volatile condensables which is immiscible with the water. I can separate the volatile condensables from the water by evaporation, but in doing so certain of the volatile condensables may be lost. By adding chloroform which is a solvent for the volatile condensables, but which is immiscible with the water, I may separate out the volatile condensables from the water and subsequently either separate the volatile condensables by fractional distillation from the chloroform, or I may pour the chloroform containing the volatile condensables over the dried soluble coffee solids, whereupon the low boiling point chloroform will evaporate leaving the volatile condensables in admixture with the soluble coffee solids in which the soluble coffee solids act to pick up and retain the volatile condensables. The chloroform containing the dissolved volatile condensables being immiscible with the water resulting from the steam distillation may be separated therefrom by the use of a separatory funnel in lieu of fractional distillation.

Alternatively to separating the volatile condensables of the water by the use of the solvent, I may effect this separation by freezing in which method the solution is frozen and the volatile condensables separated from the frozen water. See my Patent No. 1,641,429.

The gases drawn off from one hundred pounds of green coffee during the final period of roasting is sufficient to flavor fifty gallons of 32 Baumé sugar syrup. To this flavored coffee syrup which is colorless, I add one hundred ounces of caramel sugar color in order to simulate the natural color of coffee. I then use this coffee flavored syrup in the proportion of one ounce of coffee syrup and five ounces of carbonated water to produce six ounces of finished carbonated beverage. I prefer to use three volumes of carbon dioxide gas in making the drink.

A preferred method for separating the volatile condensables from the water consists in distilling the volatile condensables into chloroform which dissolves the volatile condensables, the water which is distilled over separating out of the chloroform because it is immiscible therewith. Separatory funnels may be used to draw off the water. These volatiles are then recombined with the soluble coffee solids or with the liquid concentrate of soluble coffee solids in order to restore the desirable original flavor and aroma.

The final coffee concentrate of my invention which is either in the solid or liquid form according to the method employed as explained above consists of soluble coffee solids together with the volatile non-condensable components of the coffee plus the volatile condensable components of the coffee, all of which are separated and then recombined in substantially the proportions in which they are present in the original purified and roasted coffee. In order to secure the maximum flavor constituents, I utilize the following components:

1. The vapors given off during the final stage of roasting the coffee bean,
2. The products of the steam distillation of the purified roasted coffee,
3. Concentrated leached and soluble coffee solids.

A further feature of my invention comprises the employment of a liquid that is both a solvent for the volatile relatively non-condensable desirable constituents of the coffee and which also acts as a preservative for the coffee concentrate. Specifically I have exampled glycerin as such a component.

The product of my invention comprises a very desirable coffee concentrate in that it contains all of the vital taste and aroma coffee elements both volatile and non-volatile, condensable and non-condensable. These elements are combined in the proportion best suited to obtain the finest balance of the respective component elements of coffee. The undesirable elements of coffee which might induce rancidity or deterioration in the taste and aroma of the coffee are eliminated before the start of the process.

It will be noted that the boiling under vacuum of the coffee concentrate which has been prepared by leaching out the coffee residues does not result in the loss of any desirable aromatic constituents since most of the volatile elements of the coffee have already been picked up and separated by the passing of steam therethrough and the remaining volatiles are passed back into the condensing and trapping system.

Alternatively in the preparation of liquid soluble coffee concentrate I may separate the volatile condensate and then extract the soluble solids of the residue of roasted coffee with hot water and dry the soluble extract.

I then redissolve the dry soluble extract in the liquid condensate of volatile condensables in the proportion of 2.75 lbs. to 3 lbs. of powdered coffee to 44 oz. of the steam distilled condensed liquid condensables.

To this I then add 25.6 oz. glycerin in which I have caught or absorbed the volatile relatively non-condensable flavors and aromas of the coffee. Inasmuch as I require 20% of the finished product in the form of glycerin to preserve the coffee I therefore use 20% of 128 or 25.6 oz. of glycerin by volume. I then add water sufficient to make a total volume of one gallon.

This forms a coffee concentrate having a complete coffee flavor and gives sufficient soluble solids (non-volatile) so that one teaspoon of the concentrate dissolved in a cup of hot or boiling water will make a cup of excellent coffee.

It is very important not to have the liquid first-condensate of volatile condensables too strong as this produces too acidy a flavor. I prefer to continue the steam extraction of the ground and roasted coffee until I have about 7 to 8 gallons of first condensate and distillate from 150 lbs. of roasted purified coffee.

It is a particular feature of my invention that I add to the dried soluble coffee solids or to the very concentrated solution of soluble coffee solids, the volatile condensable constituents, the volatile relatively non-condensable constituents of the coffee, and effect the drying of this mixture.

I obtain new and unexpected results by this procedure because I have found that the soluble coffee solids either in the dry or concentrated liquid form pick up and retain the volatile constituents and prevent deleterious volatilization thereof so that the coffee produced by the addition of water to my concentrate either in solid or liquid form has an aroma and flavor that is superior to that produced by the concentrates of the prior art and approaches that of the finest coffee.

In this particular procedure I add to 16 ozs. soluble coffee solids, either in the solid or concentrated liquid form, 32 ozs. of aqueous solution of the volatile condensables including the carrier solution containing the volatile relatively non-condensables and this then subsequently dried to powder form.

A further product of my invention is a coffee concentrate or flavoring extract which I form by combining the volatile condensable constituents and the volatile relatively non-condensable constituents in the solvent 28, which are free from caffein and also free from any water soluble extracted solids, with a carrier solution such as aqueous sugar solution. In lieu of using a solvent 28 such as glycerine, I may pass the volatile relatively non-condensable gases directly into a very cold water solution of sugar (simple syrup), which simple syrup will condense and absorb and retain the volatile relatively non-condensable constituents of the coffee. To this solution of the volatile non-condensables in a simple syrup, I then add the volatile condensable constituents of the coffee obtained as above set forth and this combination forms a very desirable coffee concentrate which may be used for flavoring or as a base for a coffee beverage, i. e., a carbonated coffee beverage. The concentrate is entirely free from water soluble coffee solids and caffein.

Specifically, for example, I form a suitable concentrate by adding from 4 to 6 ozs. of volatile constituents (condensable and non-condensables) to a gallon of 32 Baumé simple syrup to which I add two to three ozs. of caramel sugar coloring. When I pass the volatile relatively non-condensable gases directly into the simple syrup to be captured thereby I then add a quantity of volatile condensable constituents in the proportion of approximately five gallons of volatile condensable constituents to 105 gallons of sugar solution of about 32 degrees Baumé.

By using one ounce of this coffee concentrate and five ounces of carbonated water, I obtain a delicious coffee flavored beverage which does not require any preservative to prevent spoiling because of the complete absence of any of the solids (including proteins and other soluble solids) of the coffee. The coffee concentrate of volatile constituents and simple syrup is especially desirable since the beverages resulting therefrom are devoid of any tendency to foam upon bottling or upon opening of the bottled beverage. I have found that the foaming as well as the tendency to spoil is caused by the protein and other solid particles of the coffee from which my coffee concentrate is free. This non-foaming property is important because foaming is a serious commercial difficulty that has been experienced in the previous attempts to bottle coffee beverages.

It is also within the purview of my invention to add to the sugar solution containing the volatile condensables and the volatile relatively non-condensables, a solution of concentrated soluble coffee solids in the proper proportions whereby I obtain a coffee concentrate which has the desirable full original flavor and aroma of coffee. This concentrate may be preserved by the use of suitable preservatives such as benzoate of soda.

I may employ in addition to the steam distillation above recited or entirely in lieu thereof, vacuum and heat to extract the volatile constituents of the coffee.

To obtain a de-caffeinated product, I extract the soluble solids of the coffee by leaching out such soluble solids with hot water to form a solution thereof. I then decaffeinate by first reducing the solution of soluble solids to dryness and I then apply thereto a solvent for caffein such as chloroform or any other suitable solvent that is a solvent for the caffein and a non-solvent for the other coffee solids. The chloroform dissolves out the caffein and leaves the soluble coffee solids free of the caffein. I then remove from the soluble coffee solids all traces of chloroform in some suitable manner as for example by volatilization.

I then combine the decaffeinated soluble coffee solids with the volatile condensables and the volatile relatively non-condensable gases in substantially the proportions in which these were present in the original coffee. These proportions are set forth hereinbefore. This concentrate is composed entirely of the flavor and aromatic essentials of the coffee and is free from the undesirable caffein and other obnoxious constituents.

Accordingly, I have set forth a novel process for extracting from coffee the volatile constituents, including the condensable constituents and the relatively non-condensable constituents, and employing these volatile constituents in combination with a suitable carrier solution such as simple syrup for flavoring or beverage concentrate purposes and I have also set forth a product comprising the volatile constituents recited combined with the soluble coffee solids in substantially the proportions in which they were originally present in the coffee bean. The volatile constituents may be obtained both from the steam distillation and/or application of vacuum and heat to a ground and roasted coffee and they also may be obtained by utilizing the vapors developed during the final stages of roasting of coffee.

The product set forth above may contain the normal caffein content or I may decaffeinate it according to the process set forth to obtain a caffein free product without deleteriously effecting the flavor and aromatic properties of the coffee.

A further product of my invention is made by drawing off the vapors given off during the final stage of the roasting of the coffee specifically as set forth above and these roasting vapors are then filtered to remove any undesirable impurities in the solids, cooled and then absorbed in a cold aqueous sugar solution of approximately 32° Baumé density. One ounce of this sugar solution, plus 5 ozs. of carbonated water with or without the addition of a color, such as caramel, makes a delicious carbonated beverage.

I have set forth above certain specific examples of the processes and products of my invention. Modifications thereof in the spirit of this invention will be apparent to those skilled in this art. I intend therefore to be limited not by the specific examples herein given, but only by the claims hereto appended.

I claim:

1. A method of producing a concentrated coffee extract containing substantially all desirable flavor and aroma constituents of coffee which comprises subjecting a ground and roasted coffee to steam in a closed chamber to extract the volatile constituents therefrom, condensing the condensable elements of said volatile constituents, absorbing the relatively non-condensable elements in a solvent, extracting with hot water the residue of ground coffee from which the volatile constituents have been removed by steam distillation, concentrating said solution of soluble coffee solids, combining said concentrated soluble coffee solids with said volatile condensables and said volatile relatively non-condensables in solvent in substantially the following proportions: concentrated soluble coffee solids of about thirty-six degrees Baumé, 60 oz., solvent containing volatile relatively non-condensables, 25 oz., and volatile condensables 44 oz.

2. A method of producing a concentrated coffee extract containing substantially all desirable flavor and aroma constituents of coffee which comprises subjecting a ground and roasted and purified coffee to steam in a closed chamber to extract the volatile constituents therefrom, condensing the condensable elements of said volatile constituents, absorbing the relatively non-condensable elements in a solvent, extracting with hot water the residue of ground coffee from which the volatile constituents have been removed by steam distillation, concentrating said solution of soluble coffee solids by passing said solution through a multiplicity of residues of ground coffee from which the volatile constituents have been removed by steam distillation, and combining said concentrated soluble coffee solids with said volatile condensables and said volatile relatively non-condensables in solvent in proportions substantially the same as their proportions in the original coffee.

3. A method of producing a concentrated coffee extract containing substantially all desirable flavor and aroma constituents of coffee which comprises subjecting a ground and roasted and purified coffee to steam in a closed chamber to extract the volatile constituents therefrom, condensing the condensable elements of said volatile constituents, absorbing the relatively non-condensable elements in a solvent, extracting with hot water the residue of ground coffee from which the volatile constituents have been removed by steam distillation, concentrating said solution of soluble coffee solids by heat and combining said concentrated soluble coffee solids with said volatile condensables and said volatile relatively non-condensables in solvent in proportions substantially the same as their proportions in the original coffee.

4. A method of producing a concentrated coffee extract containing substantially all desirable flavor and aroma constitutents of coffee which comprises trapping the volatile products given off during the final stage of roasting coffee, subjecting a ground and roasted coffee to steam in a closed chamber to extract the volatile constituents therefrom, condensing the condensable elements of said volatile constituents and said volatile products, cooling the relatively non-condensable elements of said volatile constituents and said volatile products, and absorbing said relatively non-condensable elements in a solvent, extracting with hot water the residue of ground coffee from which the volatile constituents have been removed by steam distillation, concentrating said solution of soluble coffee solids, and combining said concentrated soluble coffee solids with said volatile condensables and said volatile relatively non-condensables in solvent in proportions substantially the same as their proportions in the original coffee.

5. A method of producing a concentrated coffee extract containing substantially all desirable flavor and aroma constituents of coffee which comprises trapping the volatile products given off during the final stage of roasting coffee, filtering the undesired solids from said volatile products, subjecting a ground and roasted coffee to steam in a closed chamber to extract the volatile constituents therefrom, condensing the condensable elements of said volatile constituents and said volatile products, cooling the relatively non-condensable elements of said volatile constituents, absorbing said relatively non-condensable elements in a solvent, extracting with hot water the residue of ground coffee from which the volatile constituents have been removed by steam distillation, concentrating said solution of soluble coffee solids to a concentration of about 22° Baumé by passing said solution through a multiplicity of residues of ground coffee from which the volatile constituents have been removed by steam distillation.

6. A method of producing a concentrated coffee extract containing substantially all desirable flavor and aroma constituents of coffee which comprises trapping the volatile products given off during the final stage of roasting coffee, filtering the undesired solids from said volatile products, subjecting a ground and roasted coffee to steam in a closed chamber to extract the volatile constituents therefrom, condensing the condensable elements of said volatile constituents and said volatile products, cooling the relatively non-condensable elements of said volatile constituents, absorbing said relatively non-condensable elements in a solvent, extracting with hot water the residue of ground coffee from which the volatile constituents have been removed by steam distillation, concentrating said solution of soluble coffee solids to a concentration of about 36° Baumé by heating said solution under a relatively high vacuum.

7. A method of producing a concentrated coffee extract containing substantially all desirable flavor and aroma constituents of coffee which comprises trapping the volatile products given off during the final stage of roasting coffee, filtering the undesired solids from said volatile products, subjecting a ground and roasted coffee to steam in a closed chamber to extract the volatile constituents therefrom, condensing the condensable elements of said volatile constituents and said volatile products, cooling the relatively non-condensable elements of said volatile constituents, absorbing said relatively non-condensable elements in a readily drying solvent, extracting with hot water the residue of ground coffee from which the volatile constituents have been removed by steam distillation, concentrating said solution of soluble coffee solids to a concentration of about 22° Baumé by passing said solution through a multiplicity of residues of ground coffee from which the volatile constituents have been removed by steam distillation, and spray drying said liquid concentrated coffee extract to dry solid form.

8. A method of producing a concentrated coffee extract containing substantially all desirable flavor and aroma constituents of coffee which comprises trapping the volatile products given off during the final stage of roasting coffee, filtering the undesired solids from said volatile products, subjecting a ground and roasted coffee to steam in a closed chamber to extract the volatile constituents therefrom, condensing the condensable elements of said volatile constituents and said volatile products, cooling the relatively non-condensable elements of said volatile constituents, absorbing said relatively non-condensable elements in a readily drying solvent, extracting with hot water the residue of ground coffee from which the volatile constituents have been removed by steam distillation, concentrating said solution of soluble coffee solids to a concentration of about 36° Baumé by heating said solution under a relatively high vacuum, and spray drying said liquid coffee concentrate to dryness.

9. A method of producing a liquid concentrated coffee extract containing substantially all desirable flavor and aroma constituents of coffee which comprises trapping the volatile products given off during the final stage of roasting coffee, filtering the undesired solids from said volatile products, subjecting a ground and roasted coffee to steam in a closed chamber to extract the volatile constituents therefrom, condensing the condensable elements of said volatile constituents and said volatile products, cooling the relatively non-condensable elements of said volatile constituents, absorbing said relatively non-condensable elements in glycerin, extracting with hot water the residue of ground coffee from which the volatile constituents have been removed by steam distillation, concentrating said solution of soluble coffee solids to a concentration of about 22° Baumé by passing said solution through a multiplicity of residues of ground coffee from which the volatile constituents have been removed by steam distillation.

10. A method of producing a liquid concentrated coffee extract containing substantially all desirable flavor and aroma constituents of coffee which comprises trapping the volatile products given off during the final stage of roasting coffee, filtering the undesired solids from said volatile products, subjecting a ground and roasted coffee to steam in a closed chamber to extract the volatile constituents therefrom, condensing the condensable elements of said volatile constituents and said volatile products, cooling the relatively non-condensable elements of said volatile constituents, absorbing said relatively non-condensable elements in glycerin, extracting with hot water the residue of ground coffee from which the volatile constituents have been removed by steam distillation, concentrating said solution of soluble coffee solids to a concentration of about 36° Baumé by heating said solution under a relatively high vacuum.

WILBERT A. HEYMAN.

REFERENCES CITED

The following references are of record in the file of this patent:

UNITED STATES PATENTS

| Number | Name | Date |
| --- | --- | --- |
| 2,098,961 | Fronmuller | Nov. 16, 1937 |
| 2,156,212 | Wendt et al. | Apr. 25, 1939 |
| 1,123,827 | Whitaker | Jan. 5, 1915 |
| 1,367,716 | Pratt et al. | Feb. 8, 1921 |
| 1,367,725 | Trigg | Feb. 8, 1921 |
| 48,268 | Gale | June 20, 1865 |
| 439,318 | Barotte | Oct. 28, 1890 |
| 758,384 | Reichert | Apr. 26, 1904 |
| 2,155,971 | Hurseman | Apr. 25, 1939 |
| 1,292,458 | Hamor | Jan. 28, 1919 |
| 2,157,956 | Hasselhorn et al. | May 9, 1939 |
| 2,233,033 | Robison | Feb. 25, 1941 |